Dec. 9, 1930.   J. BARNES   1,784,717
SPRING CLIP
Filed Nov. 8, 1929

Inventor
James Barnes
by Wilkinson & Giusta
Attorneys.

Patented Dec. 9, 1930

1,784,717

UNITED STATES PATENT OFFICE

JAMES BARNES, OF GLASGOW, SCOTLAND

SPRING CLIP

Application filed November 8, 1929, Serial No. 405,791, and in Great Britain June 1, 1929.

My invention relates to improvements in and connected with spring-clips, and has for its object to so construct the clips as to be able to connect show-cards and goods for window display at same time, such for instance as holding price tickets to soft-goods, foot-wear, hard-wear, and such like, and effecting such a grip or hold both on the show-card or price-ticket and articles that they cannot possibly become detached unless by actual manipulation of the clip, all as hereinafter described with reference to the drawings and pointed out in the claim.

Figure 1:
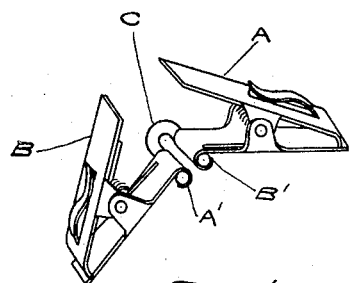

In order that my invention may be properly understood and readily carried into effect, I have hereunto appended one sheet of drawings, of which Figure 1 is a perspective view of a double spring-clip illustrating my invention.

Figure 2:
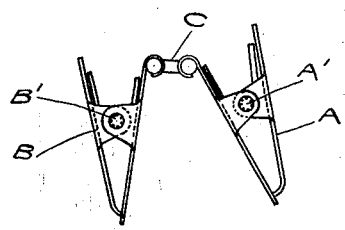

Figure 2 is a side view showing clip in different position.

According to my invention and referring to the drawings, I provide a double clip A and B, one limb of each of which is bent or turned over to form a loop A', B', for the reception of a U-shaped piece C for connecting the two clips together, and which clips are capable of being moved about to any angle or position so as to adapt themselves to circumstances.

I claim:

In a spring-clip, comprising two clips adapted to be connected together, one limb of each clip being bent over to form a loop, and a U-shape member adapted to have one of its legs pivotally received by the loop of one clip and its other leg pivotally received by the loop of the second clip.

JAMES BARNES.